United States Patent
Krauss

(10) Patent No.: US 10,606,666 B2
(45) Date of Patent: *Mar. 31, 2020

(54) HIGH PERFORMANCE LOCKS

(71) Applicant: International Business Machines Corporation, Armonk, NY (US)

(72) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/820,604

(22) Filed: Nov. 22, 2017

(65) Prior Publication Data

US 2018/0095804 A1 Apr. 5, 2018

Related U.S. Application Data

(63) Continuation of application No. 14/952,548, filed on Nov. 25, 2015, now Pat. No. 9,910,719, which is a continuation of application No. 14/533,354, filed on Nov. 5, 2014, now Pat. No. 9,424,104, which is a continuation of application No. 13/421,205, filed on Mar. 15, 2012, now Pat. No. 8,887,170, which is a continuation of application No. 12/847,666, filed on Jul. 30, 2010, now Pat. No. 8,887,167.

(51) Int. Cl.
| | |
|---|---|
| *G06F 9/46* | (2006.01) |
| *G06F 9/52* | (2006.01) |
| *G06F 9/50* | (2006.01) |
| *G06F 9/455* | (2018.01) |
| *G06F 9/48* | (2006.01) |

(52) U.S. Cl.
CPC ........... *G06F 9/524* (2013.01); *G06F 9/455* (2013.01); *G06F 9/5005* (2013.01); *G06F 9/5011* (2013.01); *G06F 9/5022* (2013.01); *G06F 9/526* (2013.01); *G06F 9/4881* (2013.01); *G06F 9/5027* (2013.01)

(58) Field of Classification Search
CPC ........ G06F 9/524; G06F 9/455; G06F 9/5005; G06F 9/5011; G06F 9/5022; G06F 9/526
See application file for complete search history.

(56) References Cited

U.S. PATENT DOCUMENTS 6,151,659 A * 11/2000 Solomon ............... G06F 3/0622
  710/200
6,412,034 B1 6/2002 Chan
(Continued)

OTHER PUBLICATIONS

Raghunathan, S.; "Extending Inter-Process Synchronization with Robust Mutex and Variants in Condition Wait", ICPADS 14th IEEE Inter. Conf. on, Dec. 8-10, 2008, pp. 121-128.
(Continued)

*Primary Examiner* — Camquy Truong
(74) *Attorney, Agent, or Firm* — William H. Hartwell; Jordan IP Law, LLC

(57) ABSTRACT

Systems and methods of enhancing computing performance may provide for detecting a request to acquire a lock associated with a shared resource in a multi-threaded execution environment. A determination may be made as to whether to grant the request based on a context-based lock condition. In one example, the context-based lock condition includes a lock redundancy component and an execution context component.

9 Claims, 4 Drawing Sheets

(56) References Cited

U.S. PATENT DOCUMENTS

| | | |
|---|---|---|
| 6,687,903 B1 | 2/2004 | Chalmer et al. |
| 7,289,992 B2 | 10/2007 | Walker |
| 7,356,653 B2 | 4/2008 | von Praun et al. |
| 7,603,502 B2 | 10/2009 | Richter et al. |
| 8,095,921 B2 * | 1/2012 | Krauss ............... G06F 11/3409 717/116 |
| 8,332,858 B2 | 12/2012 | Krauss |
| 8,887,167 B2 | 11/2014 | Krauss |
| 8,887,170 B2 | 11/2014 | Krauss |
| 9,424,104 B2 | 8/2016 | Krauss |
| 9,910,719 B2 | 3/2018 | Krauss |
| 2005/0149945 A1 | 7/2005 | Stichnoth |
| 2007/0067777 A1 | 3/2007 | Branda et al. |
| 2007/0083274 A1 | 4/2007 | Krauss |
| 2008/0163175 A1 | 7/2008 | Krauss |
| 2008/0184238 A1 | 7/2008 | Ruemmler |
| 2008/0201393 A1 | 8/2008 | Krauss |
| 2008/0216079 A1 | 9/2008 | Siegwart |
| 2009/0037888 A1 * | 2/2009 | Tatsuoka ............... G06F 9/524 717/135 |
| 2009/0037927 A1 | 2/2009 | Sangili et al. |
| 2009/0171963 A1 | 7/2009 | Uceda-Sosa et al. |
| 2009/0248689 A1 | 10/2009 | Petersen et al. |
| 2010/0005467 A1 | 1/2010 | Shpeisman et al. |
| 2010/0057965 A1 | 3/2010 | Nir-Buchbinder et al. |
| 2012/0030681 A1 | 2/2012 | Krauss |
| 2012/0117333 A1 * | 5/2012 | Akkary ............... G06F 9/3004 711/145 |
| 2012/0174116 A1 | 7/2012 | Krauss |
| 2015/0058862 A1 | 2/2015 | Krauss |
| 2016/0077891 A1 | 3/2016 | Krauss |

OTHER PUBLICATIONS

Cho et al.; "Lock-Free Synchronization for Dynamic Embedded Real-Time Systems", Date Proceedings, Mar. 6-10, 2006, vol. 1, 6 pages.

Eastep, J. et al.; "Smartlocks: Self-Aware Synchronization through Lock Acquisition Scheduling", Computer Science and Artificial Intelligence Laboratory Technical Report, MIT, MIT-CSAIL-TR-2009-055, Nov. 9, 2009, 18 pages.

Non-Final Office for U.S. Appl. No. 12/847,666, dated Sep. 18, 2012, 17 pages, United States Patent & Trademark Office.

Final Office Action for U.S. Appl. No. 12/847,666, dated Feb. 7, 2013, 17 pages, United States Patent & Trademark Office.

Non-Final Office for U.S. Appl. No. 12/847,666, dated Mar. 24, 2014, 14 pages, United States Patent & Trademark Office.

Notice of Allowance for U.S. Appl. No. 12/847,666, dated Jun. 23, 2014, 12 pages, United States Patent & Trademark Office.

Non-Final Office Action for U.S. Appl. No. 13/421,205, dated Mar. 12, 2014, 17 pages, United States Patent & Trademark Office.

Notice of Allowance for U.S. Appl. No. 13/421,205, dated Jun. 30, 2014, 23 pages, United States Patent & Trademark Office.

Corrected Notice of Allowance for U.S. Appl. No. 13/421,205, dated Aug. 26, 2014, 6 pages, United States Patent & Trademark Office.

Non-Final Office Action for U.S. Appl. No. 14/533,354, dated Apr. 28, 2015, 13 pages, United States Patent & Trademark Office.

Notice of Allowance for U.S. Appl. No. 14/533,354, dated Aug. 28, 2015, 13 pages, United States Patent & Trademark Office.

Notice of Allowance for U.S. Appl. No. 14/533,354, dated May 16, 2016, 9 pages, United States Patent & Trademark Office.

Non-Final Office Action for U.S. Appl. No. 14/952,548, dated Jun. 28, 2017, xx pages, United States Patent & Trademark Office.

Notice of Allowance for U.S. Appl. No. 14/952,548, dated Oct. 19, 2017, xx pages, United States Patent & Trademark Office.

* cited by examiner

HIGH PERFORMANCE LOCKS

CROSS-REFERENCE TO RELATED APPLICATIONS

The present application is a continuation of U.S. patent application Ser. No. 14/952,548 filed Nov. 25, 2015, which is a continuation of U.S. patent application Ser. No. 14/533,354 filed Nov. 5, 2014, issued as U.S. Pat. No. 9,424,104 on Aug. 23, 2016, which is a continuation of U.S. patent application Ser. No. 13/421,205 filed Mar. 15, 2012, issued as U.S. Pat. No. 8,887,170 on Nov. 11, 2014, which is a continuation of U.S. patent application Ser. No. 12/847,666 filed on Jul. 30, 2010, issued as U.S. Pat. No. 8,887,167 on Nov. 11, 2014.

The present application is related to U.S. patent application Ser. No. 11/617,621, filed Dec. 28, 2006, and issued as U.S. Pat. No. 8,332,858.

BACKGROUND

Technical Field

Embodiments of the present invention generally relate to the use of locks in multi-threaded execution environments. More particularly, embodiments relate to the use of context-based lock conditions to enhance performance in such environments.

Discussion

Computing system thread safety measures may include the use of synchronization objects (e.g., "locks") to control access to resources that are shared between running threads. These measures could negatively impact software performance, however, particularly in modern multi-core computing environments. While lock acquisition scheduling techniques might aid in mitigating lock-related performance concerns, there still remains considerable room for improvement. For example, scheduling techniques may fail to take into consideration whether locks actually need to be acquired in the context in which a given thread is running.

BRIEF SUMMARY

Embodiments may provide for a computer-implemented method in which a request to acquire a lock is detected, wherein the lock is associated with a shared resource in a multi-threaded execution environment. The method may also provide for determining whether to grant the request based on a context-based lock condition.

In addition, embodiments can include a computer program product having a computer readable storage medium and computer usable code stored on the computer readable storage medium. If executed by a processor, the computer usable code may cause a computer to detect a request to acquire a lock associated with a shared resource in a multi-threaded execution environment, and determine whether to grant the request based on a context-based lock condition.

Embodiments may also provide for a computer-implemented method in which a runtime analysis of a multi-threaded execution environment is conducted, and a context-based lock condition is identified based on the runtime analysis and a threshold. The threshold can include at least one of a wait time threshold and an occurrence threshold. The context-based lock condition may include a lock redundancy component and an execution context component. The method can also provide for detecting a request to acquire a lock associated with a shared resource in the multi-threaded execution environment. If both the lock redundancy component and the execution context component of the context-based lock condition are satisfied, the request may be denied. In addition, if both the lock redundancy component and the execution context component are not satisfied, the request can be granted.

Other embodiments may include a computer program product having a computer readable storage medium and computer usable code stored on the computer readable storage medium, wherein, if executed by a processor, the computer usable code can cause a computer to conduct a runtime analysis of a multi-threaded execution environment, and identify a context-based lock condition based on the runtime analysis and a threshold. The threshold may include at least one of a wait time threshold and an occurrence threshold, and the context-based lock condition may include a lock redundancy component and an execution context component. The computer usable code can also detect a request to acquire a lock associated with a shared resource in the multi-threaded execution environment. If both the lock redundancy component and the execution context component of the context-based lock condition are satisfied, the computer usable code may deny the request. If both the lock redundancy component and the execution context component are not satisfied, the computer usable code can grant the request.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
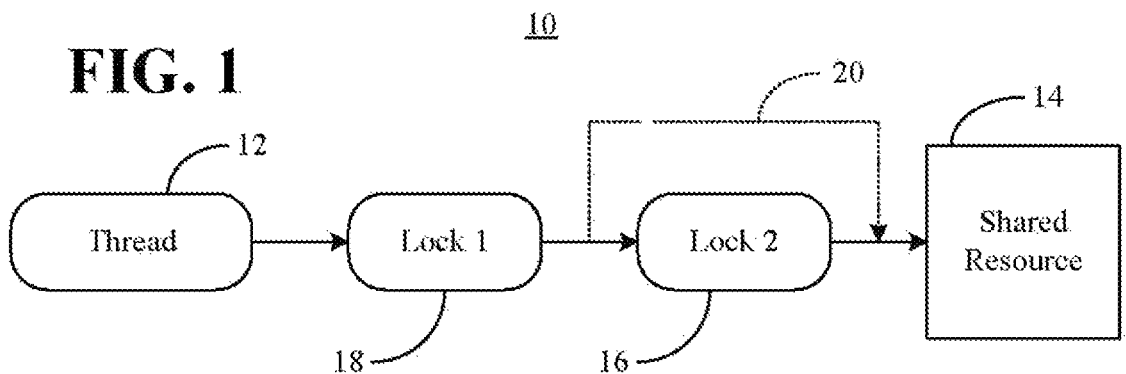
FIG. 1 is a block diagram of an example of a scheme of leveraging context-based lock conditions according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a scheme 10 of leveraging context-based lock (e.g., synchronization object) conditions is shown. In the illustrated example, a thread 12 executing on a computing system attempts to access a shared resource 14 of the system, wherein the shared resource 14 is protected by an associated (e.g., but not dedicated) lock 16 ("Lock 2"). Thus, the illustrated thread 12 might be configured to acquire (e.g., "engage") the lock 16 before being permitted access to the shared resource 14, wherein if the lock 16 is held by another thread (not shown) in the system, the thread 12 could be forced to wait until the lock 16 is available. Moreover, each of the other threads in line for the shared resource 14 might also be forced to wait until the lock 16 is available to the thread in question.

It may be determined, however, that each time the thread 12 (as well as the other threads in the system), accesses the shared resource 14, that another lock 18 ("Lock 1"), is also acquired by the thread in question. An example of such a case might be a call chain in which the content of another resource (not shown) associated with the lock 18 is recomputed based on the content of the shared resource 14. Thus, an effective lock redundancy may exist with regard to the locks 16, 18 in the context of the particular call chain. The illustrated scheme 10 identifies a context-based lock condition based on such an execution context and lock redundancy, and uses the context-based lock condition to selectively permit access to the shared resource 14 without also requiring acquisition of the associated lock 16. In one example, the programmatically designed behavior of the thread 12 is dynamically modified so that the thread 12 achieves such access. Simply put, the scheme 10 can enable the thread 12 to bypass the lock 16 associated with the shared resource 14 along execution path 20 if the context-based lock condition is met. Accordingly, the wait time associated with obtaining the lock 16 may be eliminated, which can significantly enhance system performance.

Figure 2A:
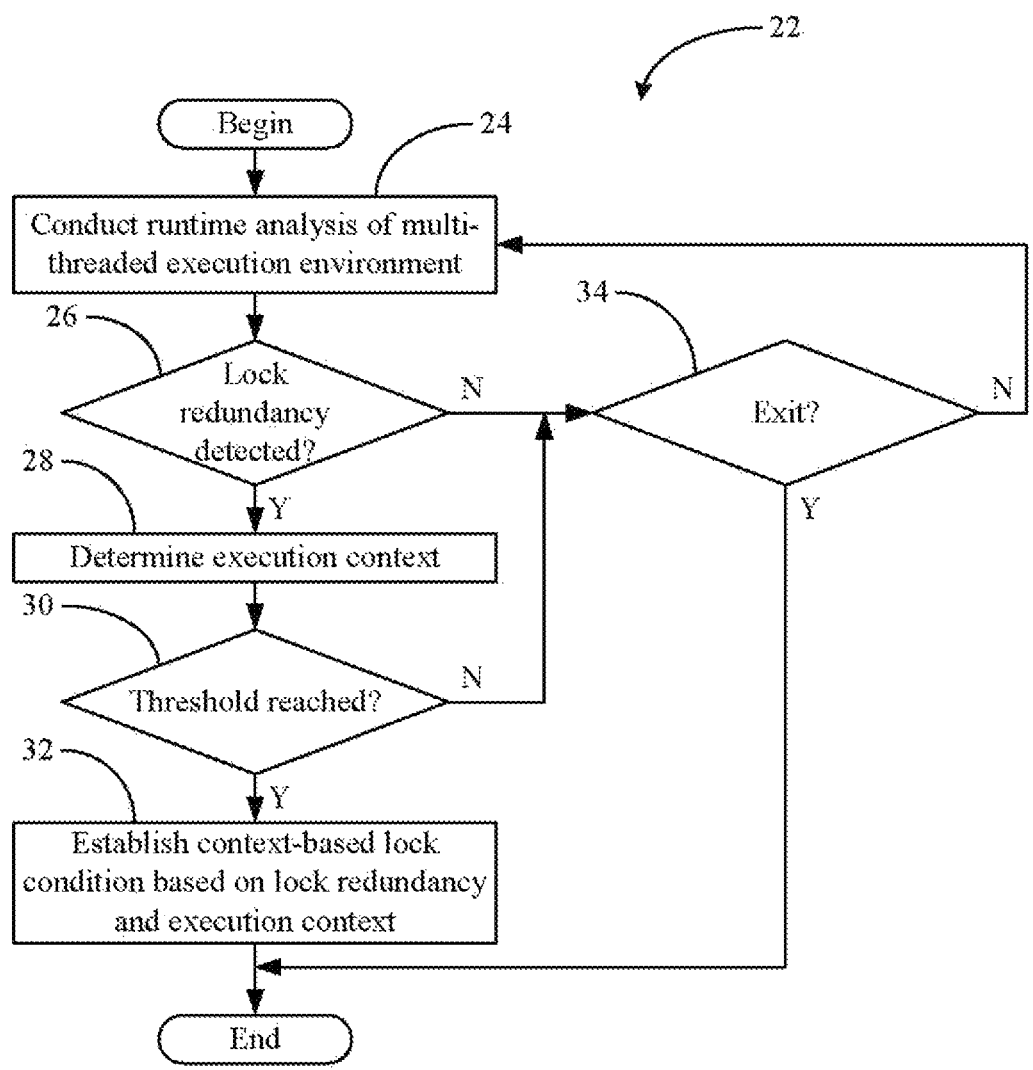
FIG. 2A is a flowchart of an example of a method of identifying a context-based lock condition according to an embodiment.

FIG. 2A shows one approach to identifying a context-based lock condition in method 22. The method 22 could be implemented in executable software as a set of logic instructions stored in a machine- or computer-readable storage medium such as random access memory (RAM), read only memory (ROM), programmable ROM (PROM), flash memory, etc., as a set of functions explicitly invoked in place of standard OS (operating system) provided API (application programming interface) functions, as a software component that dynamically intercepts such API functions, and so on.

Processing block 24 provides for conducting a runtime analysis of a multi-threaded execution environment for a deployed system (i.e. a system not under test). The runtime analysis might take into consideration program threads, synchronization objects, functions/methods, etc., present in the runtime architecture. If it is determined at block 26 that a lock redundancy (or other basis for constructing a context-based lock condition) is present, the execution context can be determined at block 28. Illustrated block 30 provides for determining whether a threshold is reached. One example of a threshold might be a wait time threshold that establishes an amount of accumulated time that threads spend waiting for one or more of the locks corresponding to the lock redundancy. Thus, the wait time threshold could enable a severity metric to be built into the system, wherein if threads are spending a relatively long amount of time waiting for a redundant lock, the issue may be addressed via the generation and use of an appropriate context-based lock condition. Another example of a threshold could include an occurrence threshold in which lock redundancies that are encountered often can be mitigated through the generation and use of a context-based lock condition. Other thresholds and/or combinations of thresholds may also be used.

If the threshold is reached at block 30, a context-based lock condition can be established at block 32 based on the lock redundancy and the execution context. In particular, the context-based lock condition could include a lock redundancy component that identifies two or more locks (e.g., Lock 1 and Lock 2), and an execution context component that that identifies a function call chain (e.g., Function B, Function A). If it is determined that either a lock redundancy (or other basis for constructing a context-based lock condition) is not detected at block 26 or the appropriate threshold has not been reached at block 30, illustrated block 34 provides for determining whether the method 22 should be exited.

Figure 2B:
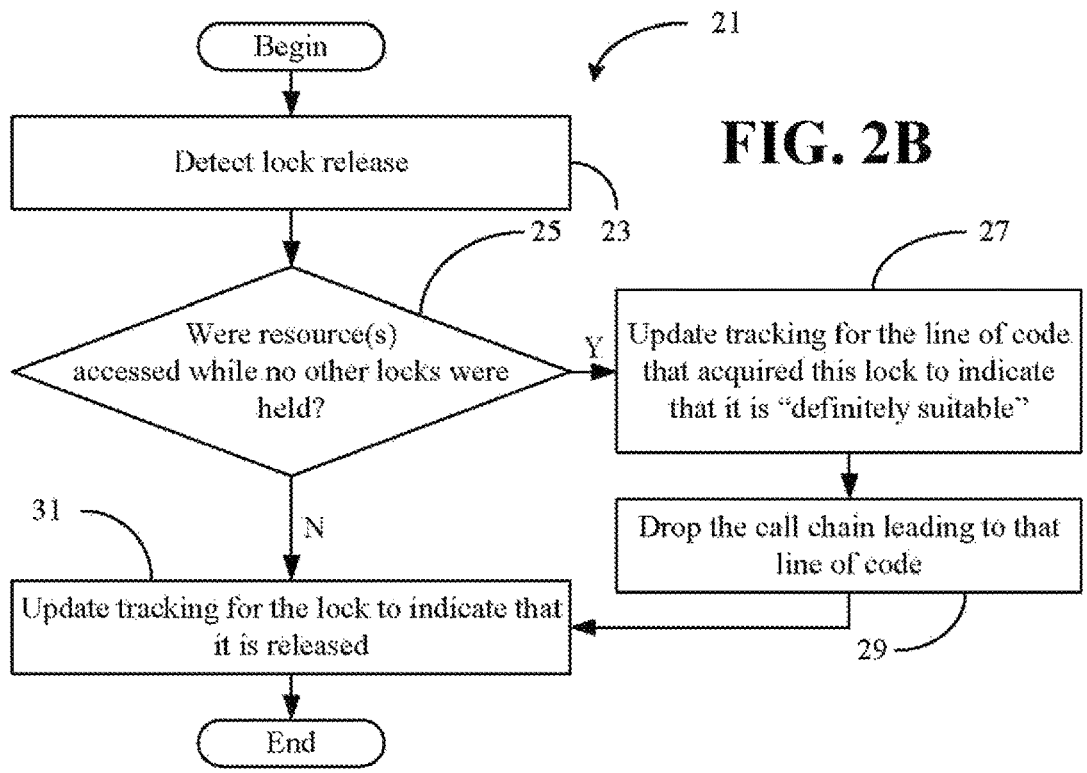
FIG. 2B is a flowchart of an example of a lock release method according to an embodiment.

FIG. 2B shows another approach in which a "suitability" metric is used at method 21, and in which a call chain is used to identify each context-based lock condition. Upon detecting a release (e.g., disengagement) of the subject lock (e.g., synchronization object) by a thread at block 23, method 21 may determine at block 25 whether resource(s) were accessed while no other locks were held. If it is determined at block 25 that one or more resources were accessed while the subject lock was acquired and while no other locks were acquired, method 21 may update at block 27 a tracking list for the line(s) of code that acquired the subject lock to indicate that the use of this lock by these line(s) of code is "definitely suitable". Further, method 21 may drop the call chain leading to the line of code at block 29. For example, a call chain may be dropped by e.g., deallocating the memory in which the call chain was stored.

Whether or not it is determined at block 25 that the code that acquired the lock was not previously identified as "apparently unsuitable", method 21 may update the synchronization object tracking list at block 31 to indicate that the subject lock is disengaged.

Figure 3A:
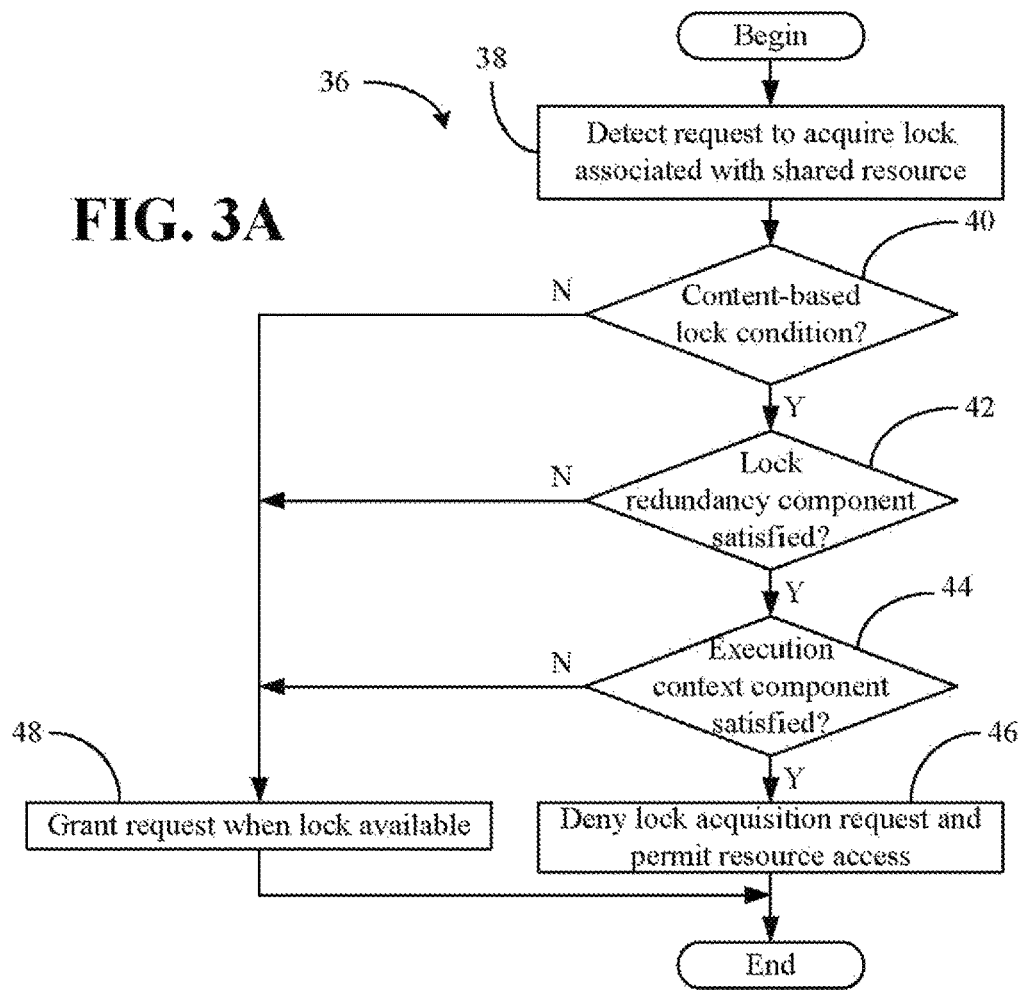
FIG. 3A is a flowchart of an example of a method of determining whether to grant a request to acquire a lock associated with a shared resource according to an embodiment.

Turning now to FIG. 3A, a method 36 of determining whether to grant a request to acquire a lock associated with a shared resource is shown. The method 36, which may be associated with the method 22 (FIG. 2A), already discussed, of identifying context-based lock conditions, could be implemented in executable software as a set of logic instructions stored in a machine- or computer-readable storage medium such as RAM, ROM, PROM, flash memory, etc., as a set of functions explicitly invoked in place of standard OS provided API functions, as a software component that dynamically intercepts such API functions, and so on.

Processing block 38 provides for detecting a request to acquire a lock associated with a shared resource. If it is determined at block 40 that the requested lock has an associated context-based lock condition, block 42 provides for determining whether a lock redundancy component of the condition is satisfied. As already noted, in addition to lock redundancies, other events, parameters and/or operating characteristics could be used as a basis for permitting access to the shared resource without acquisition of the associated lock. Block 44 provides for determining whether the execution context component of the context-based lock condition is satisfied. In other words, the illustrated approach confirms that the attempt to acquire the lock is made within the proper context before deploying the above-described bypass mechanism. Thus, if a formerly irrelevant (e.g., redundant) lock suddenly becomes relevant, the method 36 can restore the programmatic lock acquisition as intended by the thread code. If both the lock redundancy component and the execution context component are satisfied, block 46 provides for denying the request and permitting the requesting thread to access the shared resource without acquiring the lock associated with the shared resource. Otherwise, the thread may wait until the lock is available and the request is granted at block 48.

Consider, for example, a program that includes three threads, T1, T2 and T3, and three resources, R1, R2 and R3, each thought to be protected by an associated lock, L1, L2 and L3. Also, suppose certain content of R1 sometimes is recomputed based on the content of R2, and sometimes the content of R3 is recomputed based on the content of R1 and R2. One of the resources, R2, might always be accessed via an accessor function R2acc( ) that ensures thread safety by making sure lock L2 is held by any thread accessing R2, wherein lock L2 could be used to protect other resources as well. Access to resources R1 and R3 might involve code from a library that accesses resource R1 in a less modular fashion, where design constraints or historical considerations may not allow for R1 accessor functions.

The threads may make the following function calls shown in Table I on separate processor cores, approximately at the times described, in a situation where R1 will depend on R2:

TABLE I

| Time | Thread T1 | Thread T2 | Thread T3 |
|---|---|---|---|
| 0 ms | in FuncB( ) | in FuncA( ) | in FuncC( ) |
| 10 ms | acquires L1 | calls FuncB( ) | |
| 11 ms | while updating R1, discovers R2 dependency | waits for L1 | calls FuncB( ) waits for L1 |
| 12 ms | calls R2acc( ) - waits for L2 (L2 is held by a fourth thread not shown and released at t = 30 ms) | | |
| 30 ms | acquires L2 | | |
| 31 ms | completes R2acc( ) | | |
| 34 ms | releases L2 | | |
| 35 ms | returns to FuncB( ) | | |
| 36 ms | releases L1 | | |
| 36.1 ms | | acquires L1 | |
| 36.2 ms | | updates R1 (but not R2) | |
| 36.3 ms | | releases L1 | |

TABLE I-continued

| Time | Thread T1 | Thread T2 | Thread T3 |
|---|---|---|---|
| 37 ms | | returns to FuncA( ) | acquires L1 |
| 39 ms | | | R2acc( ) |

In the above situation, though the threads are running on independent processors, thread T1 waits about 20 ms for a shared resource, R2, to become available, and thread T3 waits along with T1 for its chance to access R2. Meanwhile, no thread ever accesses resource R2 without acquiring both locks L1 and L2.

An approach as described herein could observe the above situation and learn to not acquire lock L2 within R2acc( ). The lock acquisition coded into R2acc( ) could therefore be denied once the lock is satisfactorily found to be unnecessary as the run progresses. An example of the associated performance enhancement is shown below in Table II.

TABLE II

| Time | Thread T1 | Thread T2 | Thread T3 |
|---|---|---|---|
| 0 ms | in FuncB( ) | in FuncA( ) | in FuncC( ) |
| 10 ms | acquires L1 | calls FuncB( ) | |
| 11 ms | while updating R1, discovers R2 dependency | waits for L1 | calls FuncB( ) |
| 12 ms | calls R2acc( )- context- based lock condition confirmed | | |
| 13 ms | completes R2acc( ) | | |
| 14 ms | returns to FuncB( ) | | |
| 15 ms | releases L1 | | |
| 15.1 ms | | acquires L1 | |
| 15.2 ms | | updates R1 (but not R2) | |
| 15.3 ms | | releases L1 | |
| 16 ms | | returns to FuncA( ) | acquires L1 |
| 18 ms | | | R2acc( ) |

Thus, by considering whether lock L2 actually needs to be acquired in the context in which thread T1 is running, the illustrated approach can significantly reduce wait times and may provide substantially improved performance.

Figure 3B:
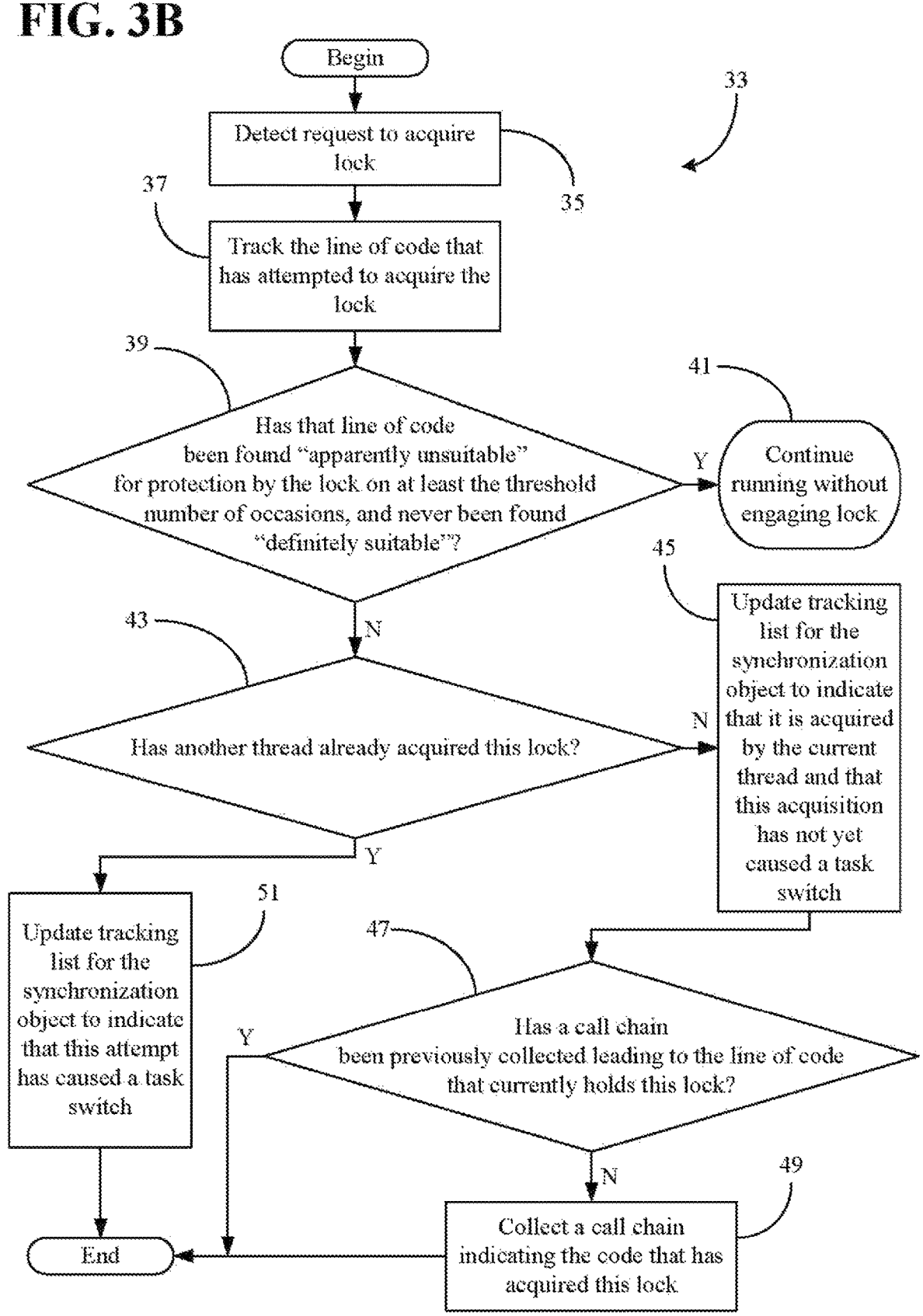
FIG. 3B is a flowchart of an example of a method of detecting acquisition of a lock according to an embodiment.

Turning now to FIG. 3B, a method 33 of detecting engagement of a synchronization object by a thread, is shown. The method 33 may generally be associated with the method 21 (FIG. 2B), already discussed, of using a suitability metric. In the illustrated example, method 33 may detect an attempt to acquire a lock at block 35. Once detected, block 37 may provide for tracking the lines of code that attempted to acquire the lock within the synchronization object tracking list described above with respect to FIG. 2B. The elements included within the synchronization object tracking list may include "suitability" and "unsuitability" counters, wherein these "suitability" and "unsuitability" counters may apply to the overall acquisition of the lock for an entire set of resources. Each list element within the synchronization object tracking list may be associated with a call chain that may indicate the means by which execution has reached the line of code that has acquired the lock. When the user of a lock suitability analysis method requests a report defining the unnecessary use of locks, the call chains for the list elements (included within the synchronization object tracking list) that are associated with apparently unnecessary lock protection may be of interest to the software developer.

A determination can be made at block 39 as to whether the line of code has been found "apparently unsuitable" for protection by the lock on at least the threshold number of occasions, and never been found "definitely suitable". If so, the illustrated method 33 continues running at block 41 without acquiring the lock.

Otherwise, a determination may be made at block 43 as to whether another thread has already acquired the subject lock. If another thread has not already acquired the subject lock, the synchronization object tracking list for the subject lock may be updated at block 45 to indicate that the subject lock is acquired (e.g., engaged) by the current thread and that this acquisition has not caused a task switch.

Task switching can refer to the situation in which a computer system executes one thread, and prior to completing execution of that thread, switches contexts to begin executing a different thread. Task switching may occur under several different circumstances. For example, one situation in which task switching may occur is when a thread runs out of time. As a multitasking operating system typically allots a predetermined amount of continuous time during which each otherwise runnable thread may execute in turn, when that time period expires, the operating system may switch to begin executing another task. While task switching allows for parallel execution of multiple threads, overly frequent task switching may cause execution of thread management tasks to consume a large percentage of processing time, which may degrade performance.

Another situation in which a computer system switches tasks may be attributable to a "blocking condition". A blocking condition occurs when a thread needs access to a resource that is protected by a lock acquired by another thread. So long as that resource is thus protected, the blocked thread is not given the opportunity to run. A blocking condition may result in delay of threads to perform actual work, which may degrade performance.

Once the synchronization object tracking list is updated at block 45, method 33 may determine if a call chain (i.e., that defines the means by which the line of code that engaged the subject lock was reached during execution of the system) had been previously collected. If not, block 49 may collect the call chain. When collecting the call chain, method 33 may walk the call chain in a manner similar to a debugger updating its call stack display. Alternatively, the scheme 10 (FIG. 1) may include methods by which a thread stack list element is recorded at each function entry, including the starting address of the function, and by which that list element is removed when the function exits. Thus, a call chain may be obtained (that includes the intercepted functions of the system) at any time by walking the recorded list.

Alternatively, if it is determined at block 43 that another thread had already acquired the subject lock, the synchronization object tracking list for the subject lock may be updated at block 51 to indicate that the intercepted attempt to acquire the subject lock has caused a task switch (i.e., from the subject thread to another runnable thread).

In addition, a "detect resource allocation" routine (not shown) can be used so that the above-described counters and tracking structures are allocated and listed. Moreover, a "detect resource deallocation" routine (not shown) may be called in order to clean up the above-described counters and tracking structures when resources are freed.

Figure 4:
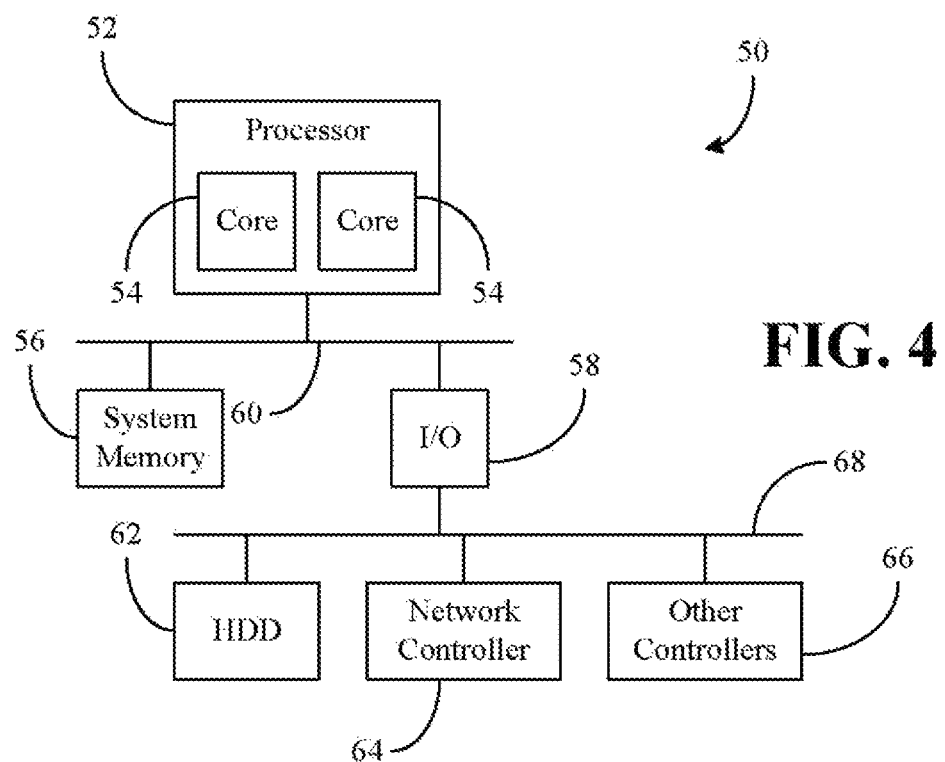
FIG. 4 is a block diagram of an example of a computing system according to an embodiment.

FIG. 4 shows a computing system 50 having a processor 52 with one or more cores 54 as well as other components such as instruction fetch units (not shown), internal caches (not shown), etc. The illustrated processor 52 is coupled to system memory 56 and an I/O (input/output) device 58 via a bus 60, wherein the I/O device 58 may provide a communication path to an HDD (hard disk drive), network controller 64 and other controllers 66 over one or more other buses 68. The network controller 64 might utilize a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification), digital subscriber line (DSL), cable modem, T1 connection), etc., to enable access to additional off-platform resources.

The cores 54 may be configured to execute various OS's and/or applications with multiple threads according to the particular circumstances. Moreover, the threads may share the internal cache(s) (not shown) of the processor 52, the system memory 56, the memory space of the HDD 62, and other resources such as an SSD (solid state disk, not shown), network resource, etc., wherein locks can be used to protect the shared resources. Accordingly, the system 50 may be configured to detect requests to access locks associated with shared resources and determine whether to grant the requests based on context-based lock conditions while the system is deployed (i.e., not under test).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A computer program product comprising:
   a computer readable storage medium; and
   computer usable code stored on the computer readable storage medium, where, when executed by a processor, the computer usable code causes a computer to:
   detect a request to acquire a lock associated with a shared resource in a multi-threaded execution environment including a first thread and a second thread; and
   deny the request in response to determining: (i) a lock redundancy component that is to include the lock and at least one other lock is satisfied, and (ii) an execution context component that is to include a function call chain to be associated with the lock and the at least one other lock is satisfied, wherein denying the request permits access to the shared resource without acquiring the lock for the shared resource; and
   grant the request in response to determining one or more of: (i) the lock redundancy component is not satisfied, and (ii) the execution context component is not satisfied, wherein granting the request allows access to the shared resource when the lock is acquired based on the grant of the request;
   wherein:
   the lock redundancy component is to include the lock associated with the shared resource and one other lock associated with one other shared resource; and
   the lock associated with the shared resource is to be held by the second thread, and the one other lock associated with the one other resource is to be held by the first thread prior to issuance of the request.

2. The computer program product of claim 1, wherein the first thread is to release the lock associated with the one other shared resource when the first thread no longer accesses the shared resource, and wherein a third thread is to acquire the lock associated with the one other shared resource.

3. The computer program product of claim 1, wherein each function of the function call chain is to utilize at least the one other lock.

4. The method of claim 3, wherein the first thread releases the lock associated with the one other shared resource when the first thread no longer accesses the shared resource, and wherein a third thread acquires the lock associated with the one other shared resource.

5. The method of claim 3, wherein each function of the function call chain utilizes at least the one other lock.

6. A method comprising:
   detecting a request to acquire a lock associated with a shared resource in a multi-threaded execution environment including a first thread and a second thread;
   denying the request in response to determining: (i) a lock redundancy component that is to include the lock and at least one other lock is satisfied, and (ii) an execution context component that is to include a function call chain to be associated with the lock and the at least one other lock is satisfied, wherein denying the request permits access to the shared resource without acquiring the lock for the shared resource; and
   granting the request in response to determining one or more of: (i) the lock redundancy component is not satisfied, and (ii) the execution context component is not satisfied, wherein granting the request allows access to the shared resource when the lock is acquired based on the grant of the request;
   wherein:
   the lock redundancy component is to include the lock associated with the shared resource and one other lock associated with one other shared resource; and
   the lock associated with the shared resource is to be held by the second thread, and the one other lock associated with the one other resource is to be held by the first thread prior to issuance of the request.

7. An apparatus comprising a processor to:

detect a request to acquire a lock associated with a shared resource in a multi-threaded execution environment including a first thread and a second thread;

deny the request in response to determining: (i) a lock redundancy component that is to include the lock and at least one other lock is satisfied, and (ii) an execution context component that is to include a function call chain to be associated with the lock and the at least one other lock is satisfied, wherein denying the request permits access to the shared resource without acquiring the lock for the shared resource; and grant the request in response to determining one or more of: (i) the lock redundancy component is not satisfied, and (ii) the execution context component is not satisfied, wherein granting the request allows access to the shared resource when the lock is acquired based on the grant of the request;

wherein:

the lock redundancy component is to include the lock associated with the shared resource and one other lock associated with one other shared resource; and the lock associated with the shared resource is to be held by the second thread, and the one other lock associated with the one other resource is to be held by the first thread prior to issuance of the request.

8. The apparatus of claim 7, wherein the first thread is to release the lock associated with the one other shared resource when the first thread no longer accesses the shared resource, and wherein a third thread is to acquire the lock associated with the one other shared resource.

9. The apparatus of claim 7, wherein each function of the function call chain is to utilize at least the one other lock.

* * * * *